Patented June 8, 1954

2,680,758

UNITED STATES PATENT OFFICE 2,680,758

DICYCLOPENTADIENYLNICKEL AND METHOD

John Cunningham Thomas, Wilmington, Del., assignor to E. I. du Pont de Nemours and Company, Wilmington, Del., a corporation of Delaware No Drawing. Application July 10, 1952,
Serial No. 298,170

5 Claims. (Cl. 260—439)

This invention relates to organometallic compounds and, more particularly, to organonickel compounds and their preparation.

Organometallic compounds are of interest for a number of catalytic applications. An outstanding example is tetraethyllead, which is employed in relatively small amounts in motor fuels as an antiknock for spark ignition engines. Many hydrocarbometallic compounds, due to their activity, have found utility in organic reactions and as catalysts for organic reactions.

A few organometallic compounds of Group VIII metals of the periodic table, e. g., the carbides and carbonyls, have been described in the literature. Of these group VIII metals, nickel has not been reported as forming organic compounds in which the nickel atom is bonded to carbon of a hydrocarbon radical.

An object of this invention is to provide a new organonickel compound. A more specific object is to provide an organonickel compound in which the nickel atom is bonded to carbon of a hydrocarbon radical. A further object is to provide a process of preparing such organonickel compound. Other objects will be apparent from the description of the invention given hereinafter.

The above objects are accomplished according to the present invention by reacting a cyclopentadienylmagnesium halide of a halogen having an atomic number of at least 17, with a nickel halide of a halogen having an atomic number of at least 17, under anhydrous conditions at a temperature of 0° C. to 150° C., to form dicyclopentadienylnickel which can be represented by the formula

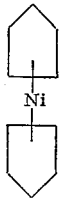

It has now been discovered that the new compound, dicyclopentadienylnickel, can be obtained by reacting a cyclopentadienylmagnesium halide of any halogen other than fluorine, i. e., a halogen having at atomic number of at least 17 with a nickel halide of any halogen other than fluorine, providing the reaction is carried out under anhydrous conditions, within the temperature range of 0° C. to 150° C., preferably between 25° C. and 100° C. The reaction is preferably carried out in an inert, liquid anhydrous medium. The dicyclopentadienylnickel is separated from the reaction mixture by crystallization, removal of solvents, or by sublimation.

The following examples in which all parts are by weight unless otherwise stated, illustrate specific embodiments of the preparation of dicyclopentadienylnickel.

Example I

Ethylmagnesium bromide was prepared by adding a solution of 22 g. (0.2 mole) of ethyl bromide in 22 g. of anhydrous benzene to 4.8 g. (0.2 mole) of magnesium turnings in 50 ml. of anhydrous ether at such a rate that a smooth reflux was maintained by the heat of reaction. The addition required 25 minutes, and during that time the temperature of the mixture rose from from 37° C. to 55° C. The mixture was then refluxed on a steam bath for 15 minutes, with the temperature rising to 62° C. After removal of the reaction mixture from the steam bath, 13.2 g. (0.2 mole) of freshly distilled cyclopentadiene in 13.2 g. of anhydrous benzene was added dropwise thereto over a period of 7 minutes. During this period the mixture refluxed constantly and the temperature dropped to 48° C. The mixture was then refluxed for 15 minutes on a steam bath with the temperature rising to 59° C.

The cyclopentadienylmagnesium bromide in which an extremely small amount of unreacted magnesium was suspended, was cooled to 28° C. and the addition of 13 g. of solid, anhydrous nickel chloride in small proportions was begun. The nickel chloride had been prepared by pyrolysis of tetrapyridinonickel chloride. During approximately the first one-third of the addition of nickel chloride, the temperature of the reaction mixture rose to 45° C., some gas was evolved, and the mixture became very dark. During the addition of the remainder of the nickel chloride, there was no further rise in temperature and no discernible evolution of gas. The mixture was refluxed on a steam bath for 15 minutes at 62–64° C. and allowed to cool to room temperature. The dark, olive-brown mixture underwent no apparent change during this heating period. The mixture was then refluxed for 25 hours further at 66–74° C. and cooled to room temperature.

Half of the resulting mixture obtained above was chilled in ice, and a cold solution of 18 g. of ammonium chloride in 54 g. of water was added cautiously with stirring. There was some temperature rise. Fifty ml. of benzene and 50 ml. of water were then added and the mixture was filtered with suction to remove precipitated solid, which was washed on the filter twice with benzene, the washings being added to the filtrate. The aqueous layer of this filtrate was discarded and the benzene layer was washed with 100 ml. of water and dried over magnesium sulfate. Most of the solvent was removed by distillation on a steam bath through a short stillhead. The residue was chilled in ice and the solid that came down, was filtered and partly air-dried. It weighed 1 g. and was a mixture of a brown solid and a dark green crystalline solid. The green crystalline solid was separated from the rest of the mixture by sublimation onto a water-cooled glass surface at 30–80° C./2 mm. There was thus obtained 0.75 g. (corresponding to a total yield of 8%) of dark green crystals of dicyclopentadienylnickel which were soluble in organic solvents and insoluble in water. The dicyclopentadienylnickel thus obtained did not have a definite melting point but decomposed at about 160–170° C. when heated rapidly on a block.

*Anal.*—Calcd. for $C_{10}H_{10}Ni$: C, 63.57; H, 5.34; Ni, 31.08. Found: C, 63.34; H, 5.41; Ni, 30.60.

*Example II*

The procedure set forth in Example I was followed with some variation of proportions of materials and the substitution of anhydrous nickel bromide for anhydrous nickel chloride. Dicyclopentadienylnickel was recovered but in substantially lower yield than in Example I.

It will be understood that the above examples are merely illustrative and that the invention broadly comprises reacting a cyclopentadienylmagnesium halide of chlorine, bromine, or iodine with a nickel halide of chlorine, bromine, or iodine under anhydrous conditions at a temperature of 0° C. to 150° C. to form dicyclopentadienylnickel which can be represented by the formula

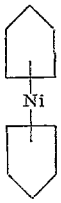

The cyclopentadienylmagnesium halide used in this reaction can be either the chloride, bromide, or iodide. It is readily prepared by the reaction of cyclopentadiene with a lower alkylmagnesium halide, preferably the methyl-, ethyl-, or propylmagnesium bromide, chloride or iodide.

The nickel salt used in the reaction can likewise be the bromide, chloride, or iodide, with the chloride being preferred. The proportion of cyclopentadienylmagnesium halide to nickel halide is not critical. The reaction uses 2 moles of cyclopentadienylmagnesium halide to 1 mole of nickel halide and the two reactants can be used in such proportion although an excess of either does not adversely affect the reaction.

The reaction is conveniently carried out under reflux at substantially atmospheric pressure. A temperature of at least 0° C. should be used and it is not advisable to exceed a temperature of 150° C. appreciably. A temperature between 25° C. and 100° C. is preferred.

The reaction is carried out under anhydrous conditions. Normally, the cyclopentadienylmagnesium halide is prepared in an organic solvent. It is preferred to carry out the reaction in the presence of an inert liquid medium, such as anhydrous benzene.

Separation of the dicyclopentadienylnickel can be effected by crystallization, removal of solvents, or sublimation.

Dicyclopentadienylnickel is effective as an antiknock agent in fuels for spark ignition engines. It is also useful as a catalyst for organic reactions and can be employed as an intermediate in the production of other organic compounds.

As many apparently widely different embodiments of this invention may be made without departing from the spirit and scope thereof, it is to be understood that the invention is not limited to the specific embodiments thereof except as defined in the appended claims.

The invention claimed is:

1. Dicyclopentadienylnickel.

2. Process of preparing dicyclopentadienylnickel which comprises reacting a cyclopentadienylmagnesium halide of a halogen having an atomic number of at least 17, with a nickel halide of a halogen having an atomic number of at least 17, under anhydrous conditions at a temperature of 0° C. to 150° C.

3. Process as set forth in claim 2 wherein said reaction is carried out in the presence of an inert liquid solvent for said cyclopentadienylmagnesium halide.

4. Process as set forth in claim 3 wherein said nickel halide is nickel chloride.

5. Process as set forth in claim 4 wherein said cyclopentadienylmagnesium halide is the bromide.

References Cited in the file of this patent

Kealy et al., Nature, Dec. 15, 1951
Gilman et al., J. Am. Chem. Soc., vol. 61, page 957.
Weichselfeder, Ann. vol. 447, pages 66–67 (1926).